(No Model.) 2 Sheets—Sheet 1.
J. B. POPE.
ADJUSTABLE DISTRIBUTING WEIR.
No. 585,875. Patented July 6, 1897.
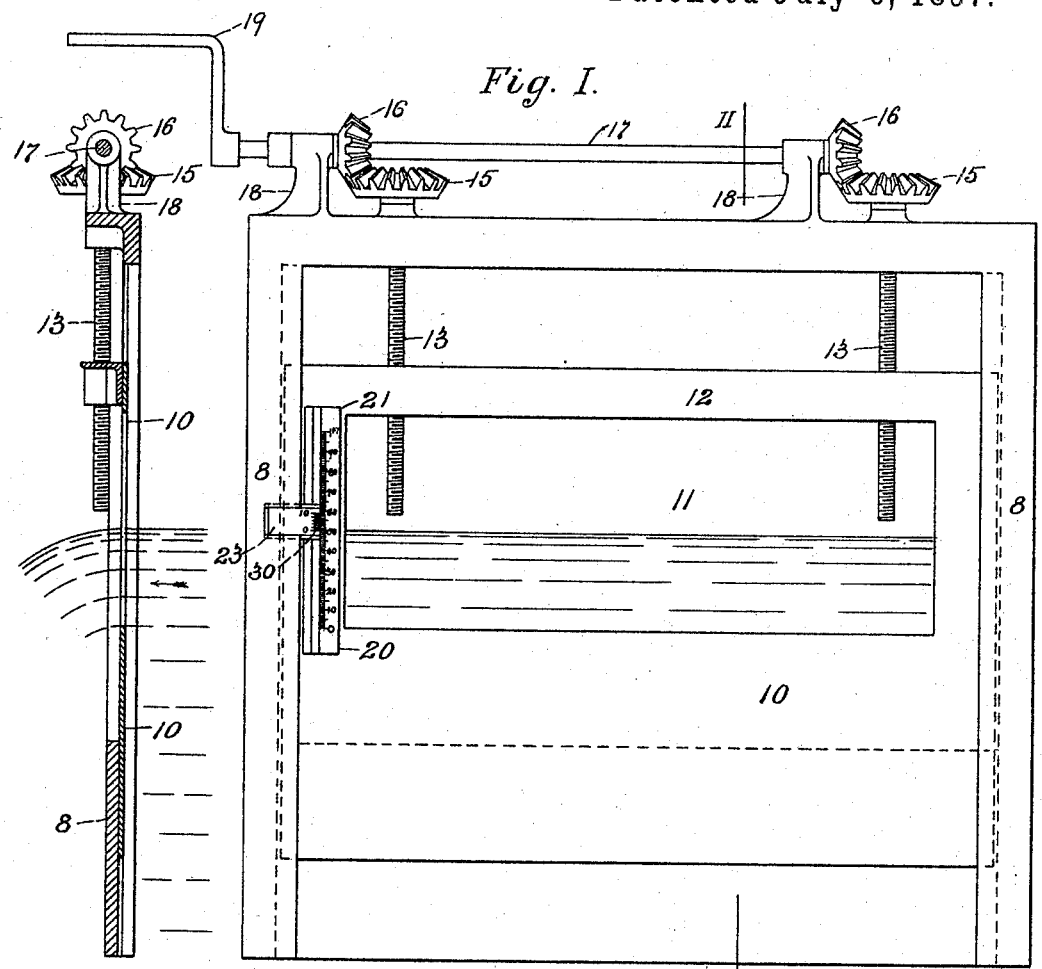
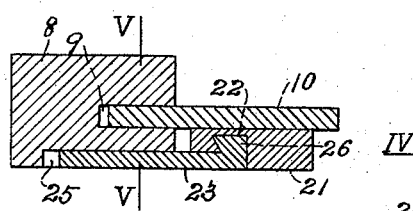
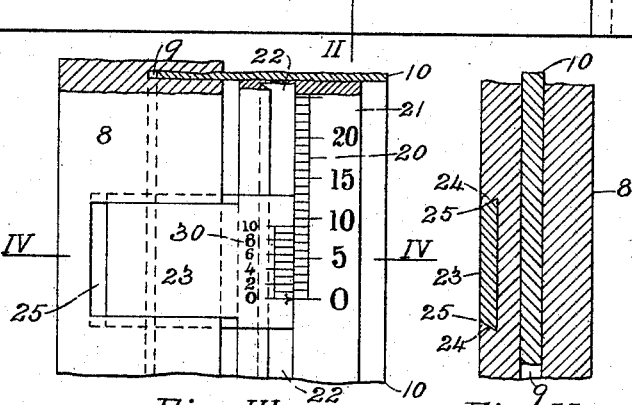
WITNESSES
Henry E. Brett
J. M. Roelofs
INVENTOR
J. B. Pope
BY
Knight Bros.
ATTORNEYS.

(No Model.) 2 Sheets—Sheet 2.
J. B. POPE.
ADJUSTABLE DISTRIBUTING WEIR.
No. 585,875. Patented July 6, 1897.
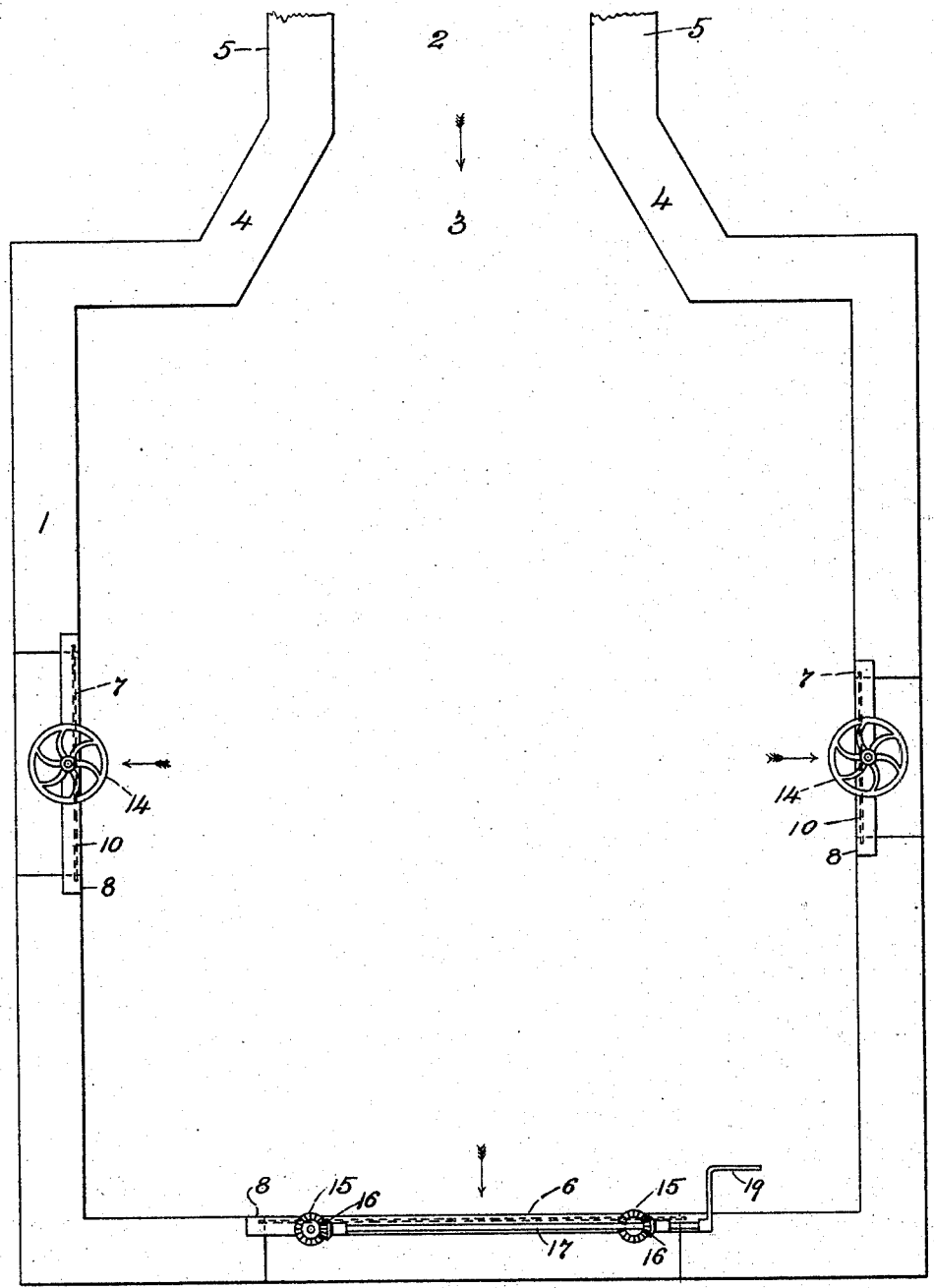
Fig. VI.
WITNESSES
Henry E. Brett
J. A. Roelofs
INVENTOR
J. B. Pope
BY Knight Bros.
ATTORNEYS.

UNITED STATES PATENT OFFICE.

JAMES B. POPE, OF SAN BERNARDINO, CALIFORNIA.

ADJUSTABLE DISTRIBUTING-WEIR.

SPECIFICATION forming part of Letters Patent No. 585,875, dated July 6, 1897.

Application filed January 23, 1897. Serial No. 620,402. (No model.)

*To all whom it may concern:*

Be it known that I, JAMES B. POPE, a citizen of the United States, residing at San Bernardino, in the county of San Bernardino and State of California, have invented certain new and useful Improvements in Adjustable Distributing-Weirs, of which the following is a full, clear, and exact description, reference being had to the accompanying drawings, which form a part of this specification.

My invention relates to improvements in weirs for the distribution of irrigating-water or water for other purposes and the proper measurement of the same in cubic feet; and my invention consists in certain features of novelty hereinafter described and claimed.

Figure I represents a side elevation of one of the distributing-weirs. Fig. II is a transverse vertical section taken on line II II, Fig. I. Fig. III is a detail perspective showing scale and vernier for measuring the supply of water which it is desired to let pass through the weir. Fig. IV is a detail transverse section taken on line IV IV, Fig. III. Fig. V is a detail vertical section taken on line V V, Fig. IV. Fig. VI is a plan view of distribution-box, showing main and lateral weirs.

Referring to the drawings, 1 represents the distribution-box, having an inlet 2, a portion of which is widened, as shown at 3, by forming diverging portions 4 in the supply-flume 5 at the point where it joins the distribution-box 1.

6 represents a main weir on general line with the inlet, and 7 represents side or lateral weirs for the lateral distribution of water, the size of the weirs being governed by the amount of acreage that is to be irrigated by the water passing through that weir.

8 represents a weir-frame suitably secured in the wall of the distribution-box and having vertical|grooves 9, into which is set a weir-plate 10 to move freely either up or down.

11 represents an aperture formed in the weir-plate through which water passes.

12 represents a section of the weir-plate through which extend operating-screws 13 for the purpose of raising or lowering the weir-plate. The weir-plate may be operated by a single hand-wheel 14, or bevel-gears 15 may be secured to the upper end of the screws 13, said gears being operated by means of gears 16, meshing therein, said gears 16 being located on a rod 17, supported by brackets 18, with a crank 19 on the end of the rod for revolving the same. Where a narrow weir is used, the hand-wheel will be found sufficient to operate the weir-plate; but where the weir-plate is of considerable width it will probably be found best to use the construction shown in Fig. I. In order to set the weir-plate at any desired point, I place a graduated scale 20 on one side of the weir, said graduated scale being divided up in fractions of feet. The scale 20 is preferably attached to a strip 21, which in turn is secured to the weir-plate, the strip 21 being provided with a groove 22, preferably made dovetail in form. (See Fig. IV.)

23 represents a movable and detachable vernier-plate having a graduated scale 30 thereon, said scale being flush with an adjoining scale 20 on the weir-plate.

The vernier-plate 23 is movably secured to the frame 8 of the weir by means of having its upper and lower edges dovetail, as shown at 24, said edges fitting into a dovetail recess 25 in the weir-frame. The end of the vernier-plate adjoining the weir-plate is provided with a dovetail lug 26, which fits into the dovetail recess 22 in the strip 21. This construction allows for expansion and contraction or other slight changes between the frame of the weir and the weir-plate. The vernier-plate will readily slide in the dovetail recess 25, and as the weir-plate is moved either up or down the lug 26 on the vernier-plate, working in the slot 22, permits the weir-plate to be moved without affecting the vernier-plate, while at the same time the scale on the vernier-plate is held in close contact with the scale on the weir-plate. The amount of water which passes through the space 11 in the weir-plate is determined by taking the head of said space which is shown by the scale 20 and by setting said scale 20 with the scale on the vernier-plate. Thus the quantity may be determined in cubic feet per second for each one-thousandth of one foot of the head in cubic feet per second the amount of water passing through the weir at any given time, as shown in Fig. III. The scale 20 on the weir-plate is set at "0" with the initial or bottom point of the scale 30 on the vernier-plate. At this time the top of the weir-plate is on line with the crest or surface of the water in the distributing-box. As the scale 30 on the vernier-plate is one-tenth less than the one-tenth part of a foot, in order to measure a one-thousandth of a foot all that is necessary to do is to move the second scale-line on the scale 20 until it comes on a line with the second scale-line on the scale 30, and in order to measure the second one-thousandth the third lines of the two scales should coincide, this rule applying all through the length of the scale 20 no matter what its position as regards the vernier-plate. By first getting the one-hundredth part of a foot it is a simple matter to measure by the means shown a one-thousandth part of a foot, thus arriving at an accuracy in measuring the amount of water used that has not heretofore been arrived at by any device for the general distribution of water.

I claim as my invention—

1. A distributing-weir comprising a weir-frame having an opening, a movable weir-plate having an opening and a graduated scale thereon and adapted to slide in the weir-frame and to control the opening in the latter, a fixed vernier-plate having a graduated scale and secured to the weir-frame, and a movable connection between the vernier-plate and the weir-plate, substantially as set forth.

2. In a distributing-weir the combination of a movable weir-plate having a strip thereon, a graduated scale on said strip, a groove formed in said strip, a fixed vernier-plate having a graduated scale thereon, and a lug on the vernier-plate engaging the groove in the strip, substantially as set forth.

3. In a distributing-weir the combination of a movable weir-plate having a strip thereon, a scale secured to the strip, a dovetail recess in the strip, a vernier-plate and a dovetail lug in the vernier-plate engaging said dovetail recess substantially as set forth.

4. In a distributing-weir the combination of a fixed frame a movable weir-plate mounted therein, a scale secured to the weir-plate and a movable vernier-plate mounted in a recess in said frame, substantially as set forth.

5. In a distributing-weir the combination of a frame having a dovetail recess, a dovetail vernier-plate movably secured in said recess, a movable weir-plate and a scale secured to the weir-plate, substantially as set forth.

6. A distributing-weir comprising a weir-frame having an opening, a vernier-plate movably supported in the weir-frame and having a scale graduated to measure to the one-thousandth part of a foot, a movable weir-plate having an opening and a scale thereon graduated to measure to a one-hundredth part of a foot, and means for moving the weir-plate in a vertical direction to control the opening in the weir-frame; substantially as set forth.

JAMES B. POPE.

Witnesses:
C. K. HOLLOWAY,
J. E. KNIGHT.